(12) United States Patent
Fuller et al.

(10) Patent No.: US 7,872,379 B2
(45) Date of Patent: Jan. 18, 2011

(54) INTEGRATED ELECTRIC POWER DISTRIBUTION CENTER FIRE PROTECTION SYSTEM

(75) Inventors: Randy Fuller, Hillsburgh (CA); Don Tegart, Mississauga (CA); Spiros Sideris, Richmond Hill (CA)

(73) Assignee: Honeywell International Inc., Morristown, NJ (US)

( * ) Notice: Subject to any disclaimer, the term of this patent is extended or adjusted under 35 U.S.C. 154(b) by 213 days.

(21) Appl. No.: 12/334,307

(22) Filed: Dec. 12, 2008

(65) Prior Publication Data

US 2010/0149708 A1    Jun. 17, 2010

(51) Int. Cl.
*H02H 3/00* (2006.01)
*G08B 17/06* (2006.01)

(52) U.S. Cl. ........................ 307/326; 340/584

(58) Field of Classification Search ............. 307/86, 307/85, 117, 326; 340/628, 500, 540, 603, 340/584; 169/56, 60
See application file for complete search history.

(56) References Cited

U.S. PATENT DOCUMENTS

| | | | | |
|---|---|---|---|---|
| 5,255,149 A | * | 10/1993 | Matsuo | 361/103 |
| 5,936,531 A | | 8/1999 | Powers | |
| 5,946,180 A | * | 8/1999 | Simpson | 361/93.3 |
| 6,104,301 A | * | 8/2000 | Golden | 340/628 |
| 6,952,169 B1 | * | 10/2005 | Simtion | 340/577 |
| 2007/0132600 A1 | | 6/2007 | Wang | |

FOREIGN PATENT DOCUMENTS

WO    WO0054042    9/2000

* cited by examiner

*Primary Examiner*—Albert W Paladini
(74) *Attorney, Agent, or Firm*—Oral Caglar, Esq.

(57) ABSTRACT

An electrical distribution control system for a vehicle such as an aircraft may be provided fire-suppression protection without requiring that all control elements are located in a fire-containment enclosure. A primary electric load center (ECL) may be located in a fire-containment equipment bay. Secondary power control centers (SPC's) may be located away from the equipment bay and close to set of loads which are controlled by the SPC's. Each SPC may be provided with a fire detecting sensor that may signal the ECL to interrupt input power to the SPC in the event of a fire in the SPC. The SPC may be constructed from self-extinguishing material. In an absence of input power to the SPC, a fire may self extinguish, thus preventing flame propagation or production of excessive external heat.

20 Claims, 6 Drawing Sheets

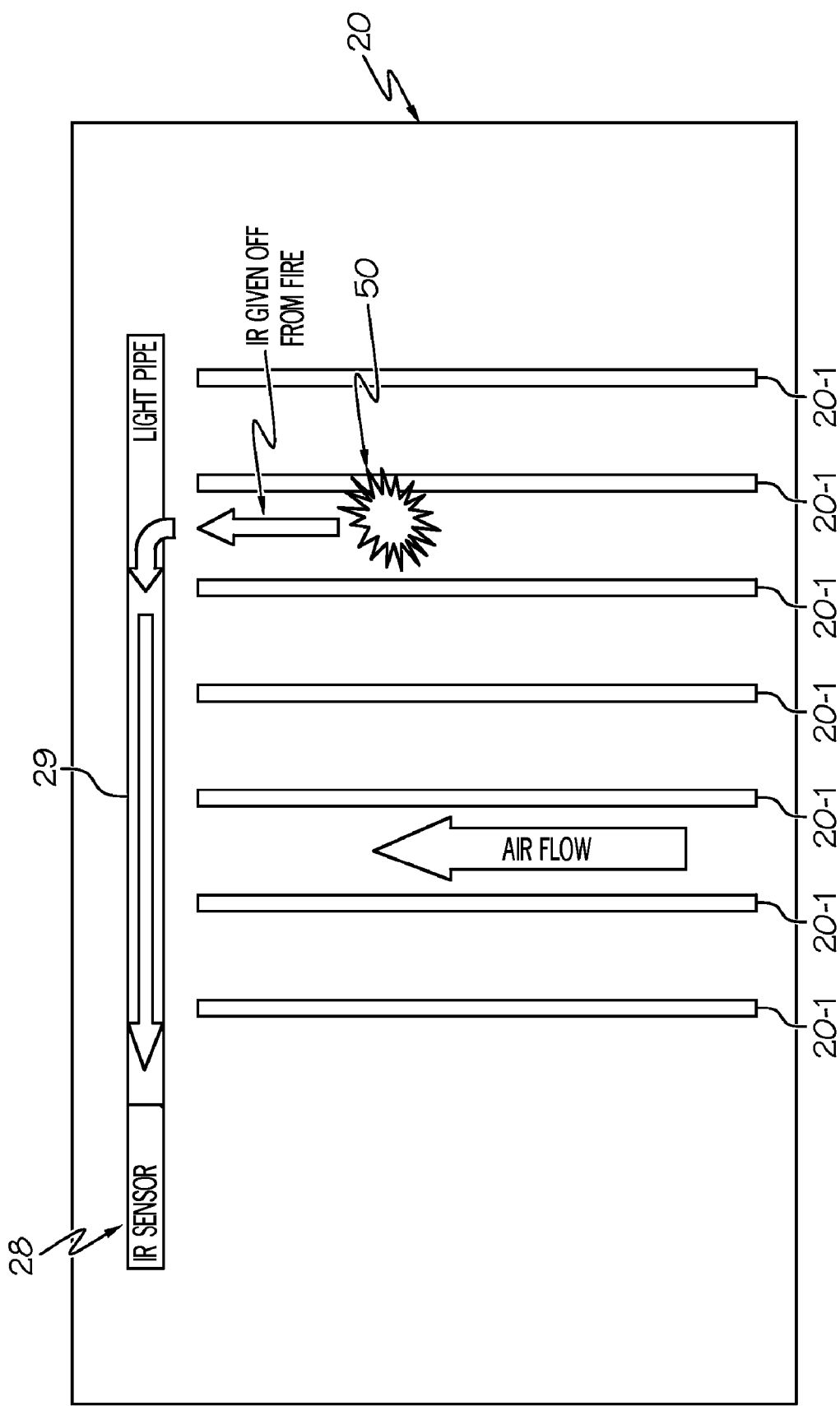

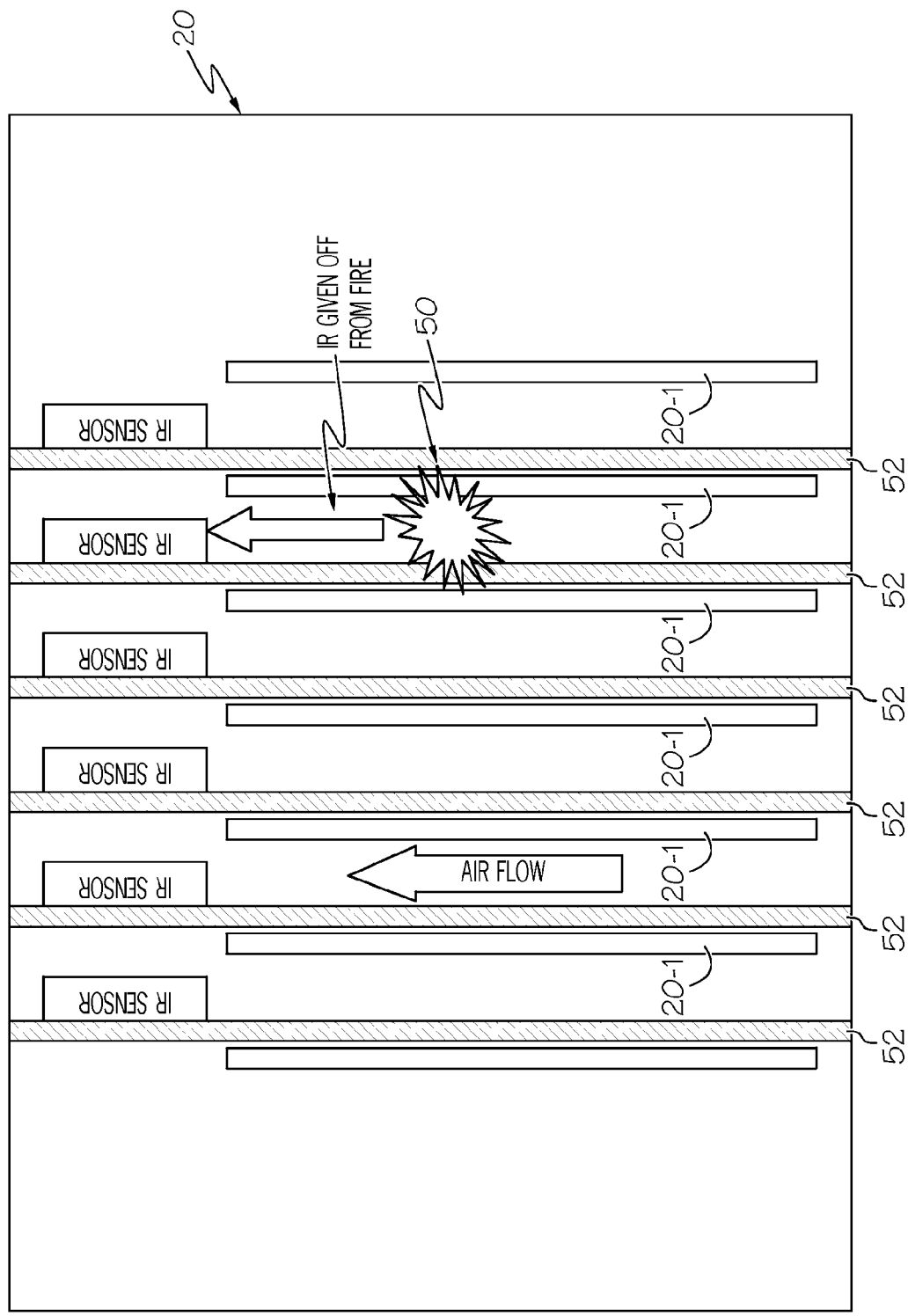

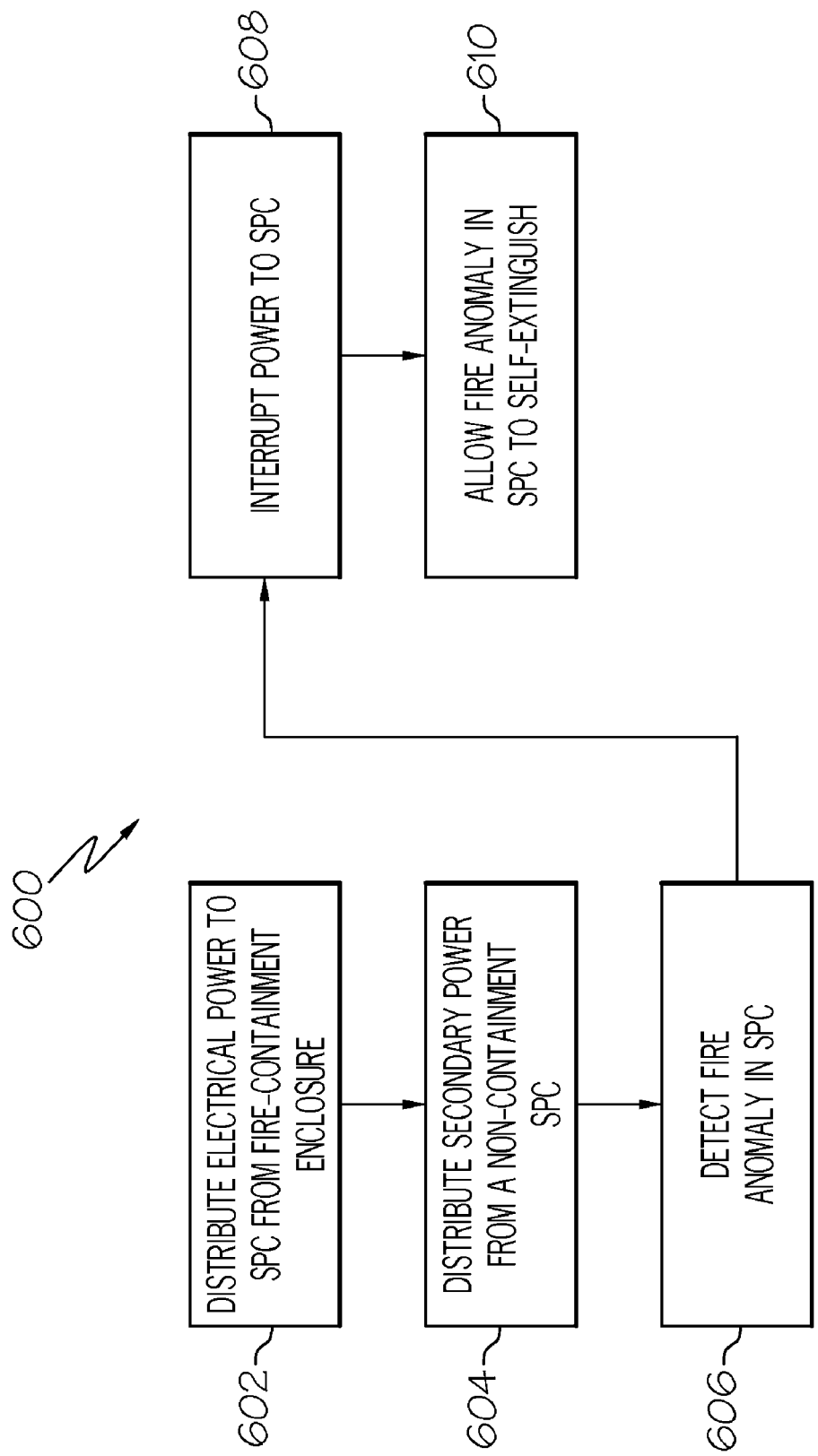

INTEGRATED ELECTRIC POWER DISTRIBUTION CENTER FIRE PROTECTION SYSTEM

BACKGROUND OF THE INVENTION

The present invention is in the field of power distribution systems and, more particularly, power distribution systems which operate in vehicles such as aircraft.

In typical prior art aircraft, power distribution control is performed with two or more independent systems which are distinctly different from one another. A first system may control primary power distribution. Primary power distribution may comprise wiring and contactors for high amperage circuitry. This high amperage circuitry may be considered electrical trunk lines. A second system may control secondary power distribution on relatively low amperage branch circuitry. Some control units for aircraft secondary power systems are typically configured as modules which can be replaced as needed. These replaceable modules are referred to as "line replaceable modules" or LRM's.

In many prior art aircraft, primary and secondary power distribution control systems are located close to one another in a dedicated portion of the aircraft. The dedicated control portion of the aircraft might be provided with a single dedicated fire suppression system. This arrangement has been provided as an important safety feature in prior art aircraft.

In some newer aircraft designs, it is desirable to position LRM's in various locations close to points in an aircraft at which secondary power is required. Primary power distribution controls may remain located in a single dedicated portion of the aircraft. Thus in newer aircraft designs, LRM's may be considered to be remotely located. Use of remotely located LRM's provides for a reduction in the amount and weight of wiring used in an aircraft. But use of remotely located LRM's produces a new set of fire safety issues.

Safety standards for aircraft require that all electrical controls (including secondary controls) must be provided with dedicated fire suppression. Thus each remotely located LRM or remotely located group of LRM's must be provided with a fire suppression system.

Fire suppression for remotely located LRM's has typically been provided by enclosing the LRM's in a fire containment enclosure. In some case, an LRM enclosure may not be designed for fire containment, but an external fire detection and extinguishing may be provided to prevent propagation of fire. Fire containment enclosures or use of fire detection/extinguishing systems add cost and weight to an aircraft. Furthermore, because LRM's produce heat during their operation, the fire containment enclosures must be provided with cooling systems that can carry away this heat. In that regard, the prior art fire containment enclosures may be considered to be heat-retaining enclosures. Cooling systems required to dissipate such retained heat add even more weight and cost.

Because of cost and weight concerns, remotely located LRM's may be grouped together in secondary electric power distribution centers which are placed in fire-containment enclosures. Because of cost and weight considerations only a few of these secondary electric power distribution centers are used in prior art aircraft. Consequently some of the LRM's may be positioned in non-optimum locations.

As can be seen, there is a need to provide a system of power distribution control which accommodates optimum distribution of remotely located LRM's within an aircraft while providing the LRM's with fire suppression protection. Additionally, there is a need to provide such fire suppression protection without use of heat retaining containment enclosures.

SUMMARY OF THE INVENTION

In one aspect of the present invention, a power distribution control system having fire suppression protection comprises a first power distribution control unit a second power distribution control unit electrically interconnected to receive input power from the first power distribution control unit and at least one sensing detector located in the second power distribution control unit and adapted to sense a fire-related anomaly in the second power distribution control unit. The first power distribution control unit is adapted to interrupt power to the second power distribution control unit in the event that the sensing detector senses a fire-related anomaly.

In another aspect of the present invention, an aircraft with a primary and secondary electrical power distribution system comprises a primary power control unit positioned in a first location of the aircraft, the first location being a fire containment location, and at least one secondary power control unit positioned in a second location of the aircraft, remote from the first location. The secondary power control unit is interconnected to receive input power from the primary power control unit. The secondary power control unit is provided with a sensing and signaling device for sensing and signaling presence of a fire-related anomaly on the secondary power control unit. The sensing and signaling device is interconnected with the primary power control unit. The primary power control unit is adapted to interrupt input power to the secondary power control unit upon receipt of a fire-related signal from the sensing and signaling device.

In still another aspect of the present invention a method for controlling power distribution in a vehicle comprises the steps of distributing electrical power to a secondary power control unit from primary power control unit located in a fire-containment enclosure, distributing electrical power from the secondary power control unit, sensing for a presence of a fire-related anomaly in the secondary power control unit, interrupting power flow to the secondary power control unit from the primary power control unit in the event of a fire-related anomaly, and allowing the fire-related anomaly to self-extinguish whereby fire-suppression protection for the secondary power control unit is provided.

These and other features, aspects and advantages of the present invention will become better understood with reference to the following drawings, description and claims.

BRIEF DESCRIPTION OF THE DRAWINGS

FIG. 4 is an internal cross-sectional view of a first embodiment of the power control unit of FIG. 3 in accordance with the present invention;

FIG. 5 is an internal cross-sectional view of a second embodiment of the power control unit of FIG. 3 in accordance with the present invention; and FIG. 6 is a flow chart of a method of controlling power distribution in accordance with the present invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful in controlling vehicle power distribution. More particularly, the present invention may provide for improved distribution of secondary power on the vehicle. The present invention may be particularly useful in vehicles such as aircraft which require fire suppression protection for all electrical control systems.

In contrast to prior-art secondary power control systems, which employ LRM's located in fire containment enclosures, the present invention may employ fire detection to detect a fire on an LRM and a control system to interrupt input power to the LRM in the event of such detection. The LRM's may be constructed from self-extinguishing material which may preclude propagation of a fire when input power to the LRM is interrupted.

Figure 1:
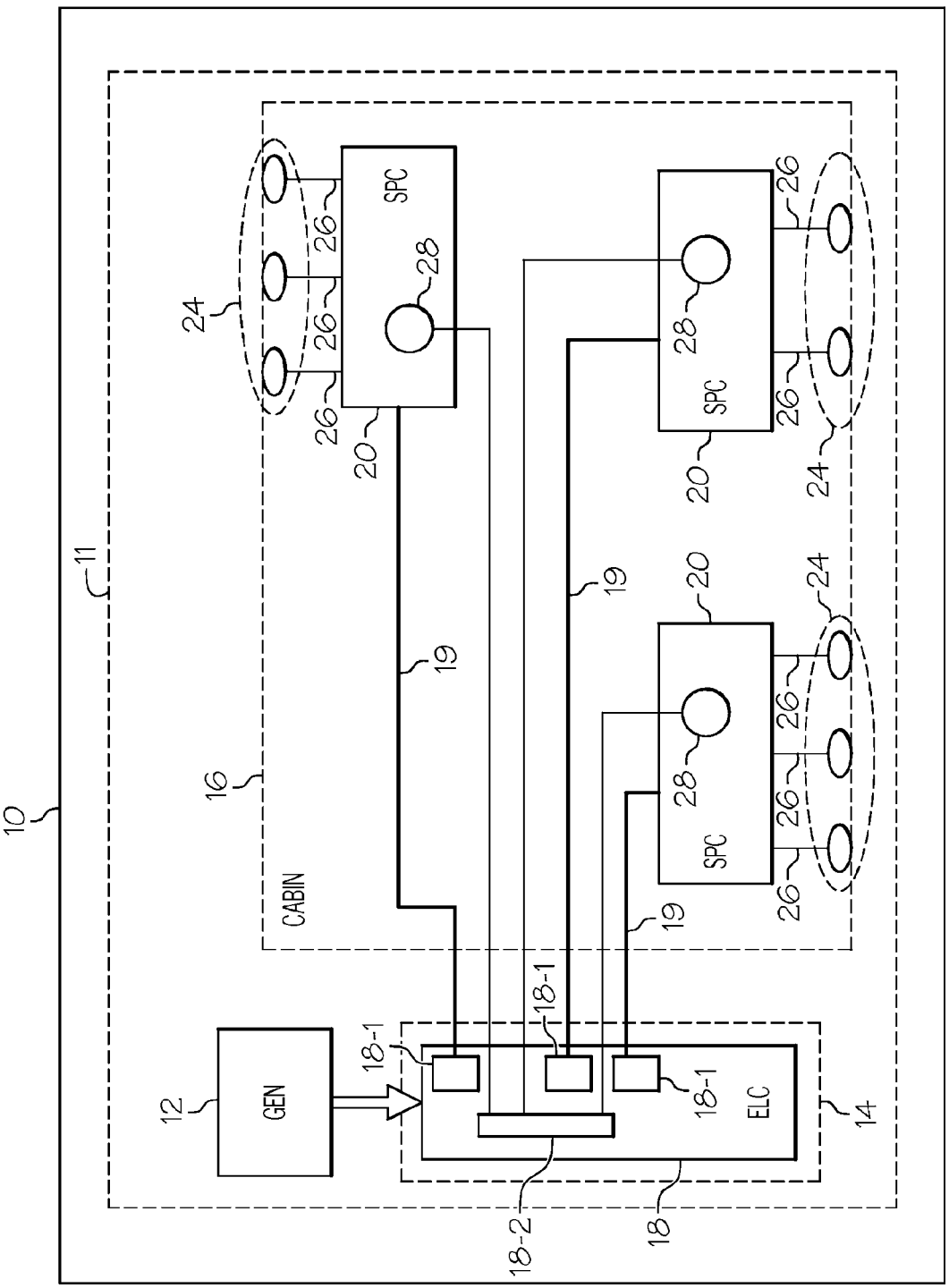
FIG. 1 is a block diagram of a vehicle in which electrical power distribution may be performed in accordance with the present invention.

Referring now to FIG. 1, a block diagram symbolically shows a vehicle such as an aircraft 10 with an electrical power distribution system 11. The aircraft 10 may comprise, among other things, an electrical power generator 12, an electrical equipment bay 14 and a cabin 16. In accordance with one embodiment of the present invention, the electrical equipment bay 14 may contain one or more primary power distribution control units, sometimes referred to as electrical load centers (ELC's) 18, which may receive input power from the generator 12 and distribute power to one or more secondary power control units or secondary power centers (SPC's) 20. Each of the SPC's 20 may contain one or more line replaceable modules (not shown in FIG. 1, see FIG. 3). Circuit breakers 18-1 may be provided to perform current interruption on trunks 19 which transmit electrical power from the ELC 18 to the SPC's 20.

The ELC 18 may be enclosed within the electrical equipment bay 14 which may be referred to herein as a fire containment enclosure 14. The enclosure 14 may be constructed to meet various aircraft safety standards such as those promulgated by the Federal Aviation Authority (FAA) and the European Aviation Safety Agency (EASA). In general, such safety standards mandate that if an unrestricted fire were to occur in a chassis of an electrical control device, the fire must be contained with no propagation of flame or external high temperatures.

In the illustrative embodiment of FIG. 1, the SPC's 20 may be located remotely from the ELC 18. Such remote location may provide desirable savings of weight and cost in the aircraft 10 because the SPC's 20 may be positioned close to various sets of electric loads 24 which are controlled by the SPC's 20. By locating the SPC's 20 relatively close to their respective sets of loads 24, branch circuit wiring 26 may be kept desirable short. For example, in some instances the branch circuit wiring 26 may have a length of less than 30 feet on an aircraft that may have an overall length of 300 feet. The ELC 18 may be more than 200 feet away from the ser of loads 24.

But, these remotely located SPC's 20 must be provided with fire-suppression protection. In accordance with FAA and ESEA standards, fire in a chassis of any electrical control device (in this case the SPC 20) must be contained with no propagation of flame or external high temperatures.

In an exemplary embodiment of the present invention, the SPC's 20 may be provided with sensing and signaling devices or detectors 28 which may be interconnected with a fire control unit 18-2. In an illustrative embodiment the fire control unit may be located in the ELC 18. The detectors 28 may sense presence of a fire-related anomaly such as sparking or excessive heat production in the SPC's 20.

Figure 2:
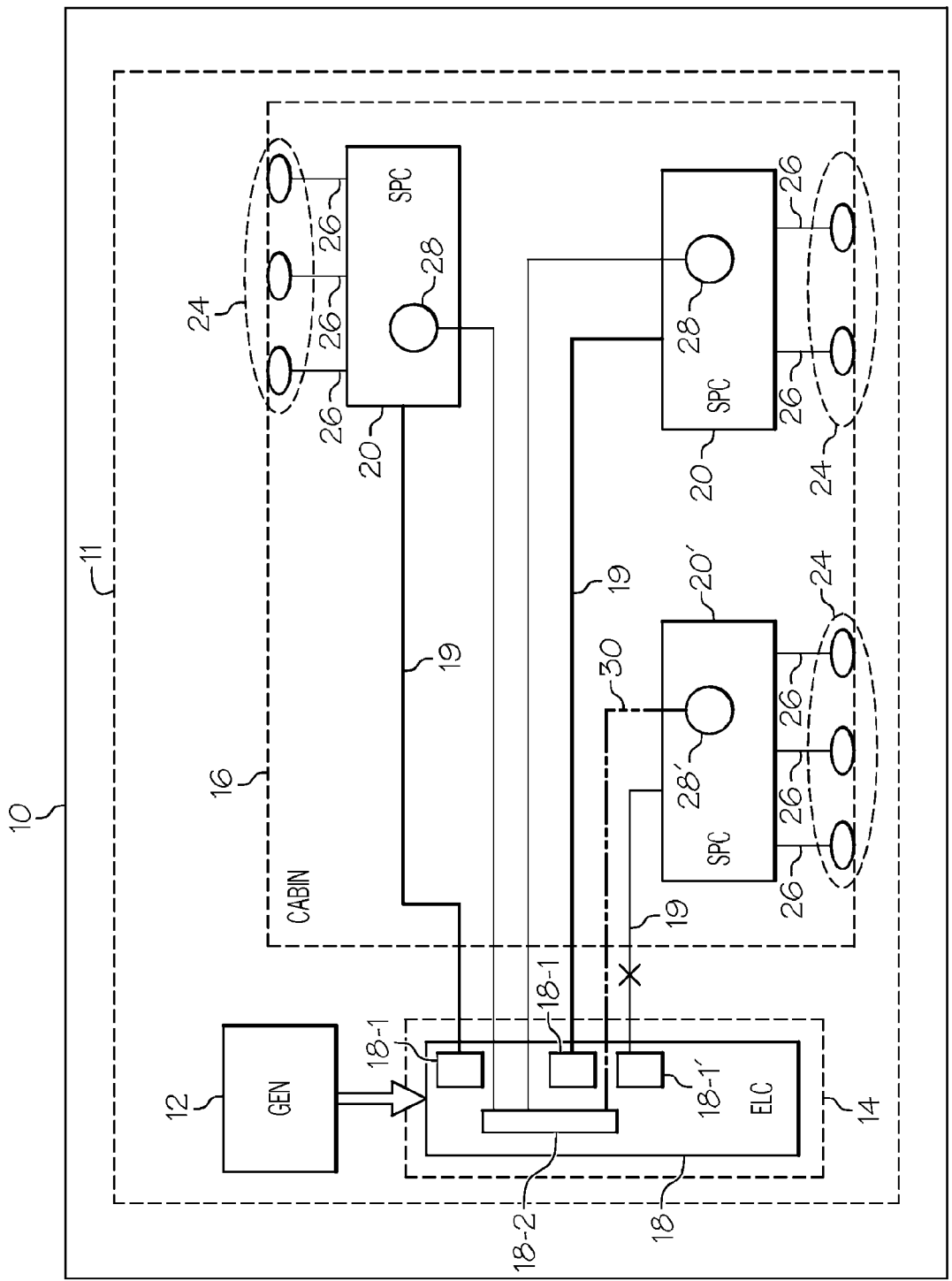
FIG. 2 is a block diagram of the vehicle of FIG. 1 in a fire suppression mode of operation in accordance with the present invention.

Referring now to FIG. 2, it may be seen that upon sensing a fire-related anomaly, one of the detectors 28 (in this case, a detector 28' in an SPC 20') may produce a fire signal 30 that may be received in the fire control unit 18-2. Upon receipt of the fire signal 30, one of the circuit breakers 18-1 (in this case, a circuit breaker 18-1') may interrupt power flow in one of the trunks 19 (in this case, a trunk 19') to the SPC 20' from which the fire signal 30 emanated.

The SPC's 20 may be constructed from self-extinguishing materials such as woven E Glass fabric impregnated with flame resistant epoxy resin Thus, a fire in one of the SPC's 20 may self extinguish in the absence of power input to the SPC 20. It may therefore be seen that, in the illustrative example of FIG. 2, a fire anomaly that may develop in the SPC 20' may not produce propagation of flame or external high temperatures.

It may be noted that in a typical aircraft electrical distribution system the ELC 18 may be constructed so that the trunks 19 are protected from overcurrent in a range of about 40 Amperes (A) to about 60 A. In many instances, a fire in one of the SPC's 20 may produce only limited overcurrent in the respective trunk 19. For example, a fire in one of the SPC's 20 may produce damage that results in an overcurrent of only 30A but the circuit breaker 18-1 associated with the SPC 20 may be set to perform overcurrent interruption only for currents in excess of 50 A. In such a case, the associated one of the circuit breakers 18-1 may not perform an overcurrent interruption in the trunk 19. But through use of the inventive combination of one of the detectors 28 and the fire control unit 18-2, the circuit breaker 18-1 may be directed to interrupt current in the trunk 19 even though a rated overcurrent is not present in the trunk 19.

Figure 3:
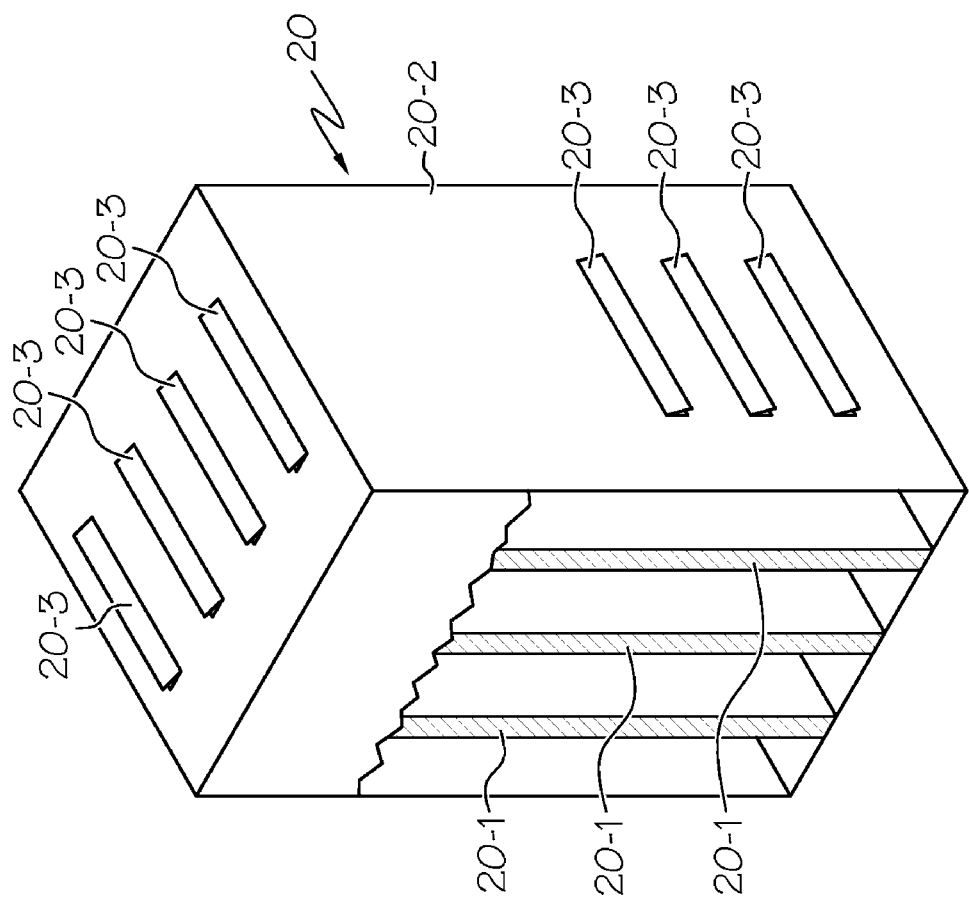
FIG. 3 is a perspective view of a power control unit in accordance with the present invention.

Referring now to FIG. 3, one of the SPC's 20 is shown in more detail. The SPC 20 may be comprised of one or more line replaceable modules (LRM's) 20-1. The SPC 20 may be enclosed in a housing 20-2. In the context of the present invention, it may not be required that housing 20-2 comprises a fire-containment enclosure. The housing 20-1 may be provided with cooling vents 20-3. Natural convection flow of cooling air may pass through the cooling vents to carry away heat generated by normal operation of the LRM's 20-1. In this regard, the SPC 20 may be constructed without complex cooling devices that might otherwise be required if the housing 20-2 were required to be a fire-containment enclosure. The SPC 20 may therefore be constructed with relatively low weight and low cost materials. Consequently, a power distribution system of the aircraft 10 may be constructed with a large number of the SPC's 20 and with each of the SPC's 20 being optimally located in a position that may maximize savings of weight and cost associated with the branch circuit wiring 26 of FIGS. 1 and 2.

Referring now to FIG. 4, an internal view of one of the SPC's 20 shows an exemplary embodiment of the detector 28. The detector 28 may comprise an infrared sensor connected to a light pipe 29. The light pipe 28-1 may be positioned over all of the LRM's 20-1. In the event of a fire anomaly 50 on one of the LRM's 20-1 (in this case an LRM 20-1'), the light pipe 29 may transmit infrared energy to the detector 28. The detector 28 may be interconnected with the fire control unit 18-2 of FIG. 2. The fire control unit 18-2 may direct one of the circuit breakers 18-1 of FIG. 2 to interrupt power to all of the LRM's 20-1 in the SPC 20. The fire anomaly 50 may dissipate because of the self-extinguishing nature of material from which the LRM's 20-1 are constructed.

Referring now to FIG. 5, one of the SPC's 20 is shown in an embodiment which comprises multiple ones of the detectors 28. One of the detectors 28 is positioned near each of the LRM's 20-1. A fire wall 52 may be positioned between each of the LRM's 20-1. In this arrangement the fire anomaly 50 may be detected only by one of the detectors (in this case, a detector 28'). The multiple detectors 28 shown in FIG. 5 may be interconnected separately to the fire control unit 18-2 of FIG. 2. In such an arrangement the ELC 18 (see FIG. 2) may be provided with a plurality of the circuit breakers 18-1 for the SPC 20 of FIG. 5. Each of the plurality of circuit breakers 18-1 may interrupt power to only one of the LRM's 20-1.

While the detectors 28 are described above as infrared sensors, it must be noted that other types of sensors may be utilized to practice the present invention. Also excessive heat production may be detected with eutectic salt type sensors that change impedance with temperature change. In some circumstances smoke detectors may be used but smoke detectors may not be capable of discriminatory detection in the manner discussed with respect to FIG. 5.

In the embodiment of FIG. 5, the sets of loads 24 (see FIG. 2) associated with the LRM 20-1' may be the only loads to which power is interrupted. This may be particularly valuable in critical situations that may require continued operation of the LRM's 20-1 other than the LRM 20-1'. Such critical situations may arise, for example, during operation of military aircraft.

In one embodiment of the present invention, a method is provided for controlling power distribution on a vehicle such as, for example, an aircraft. In that regard the method may be understood by referring to FIG. 6. In FIG. 6, a flow chart portrays various aspects of an inventive method 600.

In a step 602, electrical power may be distributed from an electrical load center which may be located in a fire-containment enclosure (e.g., the ELC 18 located in the equipment bay 14) to a remote non-containment power control center (e.g. the SPC 20). In a step 604, power from the SPC 20 may be distributed to various electrical loads (e.g., the SPC 20 may distribute power to the sets of loads 24 through the branch circuit wiring 26.

In a step 606, a fire anomaly may be detected in the SPC 20 (e.g. the detector 28 may detect sparking of excessive heat production as the fire anomaly 50). In a step 608, input power to the SPC 20 may be interrupted (e.g., the fire signal 30 may be sent to the fire control unit 18-2 which may then direct one of the circuit breakers 18-1 to disconnect one of the trunks 19).

In a step 610, a fire in the SPC 20 may be allowed to self-extinguish (e.g., materials from which the SPC 20 is constructed may be self-extinguishing in an absence of input power)

It should be understood, of course, that the foregoing relates to exemplary embodiments of the invention and that modifications may be made without departing from the spirit and scope of the invention as set forth in the following claims.

We claim:

1. A power distribution control system having fire suppression protection comprising:
    a first power distribution control unit;
    a second power distribution control unit electrically interconnected to receive input power from the first power distribution control unit;
    at least one sensing detector located in the second power distribution control unit and adapted to sense a fire-related anomaly in the second power distribution control unit;
    the first power distribution control unit being adapted to interrupt power to the second power distribution control unit in the event that the sensing detector senses the fire-related anomaly.

2. The power distribution control system of claim 1:
    wherein the first power distribution control unit is enclosed in a fire-containment enclosure; and
    wherein the second power distribution control unit is not enclosed in a fire-containment enclosure.

3. The power distribution control system of claim 1 wherein the second power distribution control unit is constructed from self-extinguishing material.

4. The power distribution control system of claim 1:
    wherein the second power distribution control unit comprises a plurality of line replaceable modules (LRM's) adapted to receive input power from the first power distribution control unit; and
    wherein the first power distribution control unit comprises circuit breakers adapted to interrupt input power to any individual one of the LRM's.

5. The power distribution control system of claim 1 wherein the sensing detector comprises an infrared sensor.

6. The power distribution control system of claim 5 wherein the sensing detector further comprises a light pipe adapted to collect infrared energy from multiple locations in the second power distribution control unit.

7. An aircraft with a primary and secondary electrical power distribution system comprising:
    a primary power control unit positioned in a first location of the aircraft;
    the first location being a fire containment location;
    at least one secondary power control unit positioned in a second location of the aircraft, remote from the first location;
    the secondary power control unit being interconnected to receive input power from the primary power control unit;
    the secondary power control unit being provided with a sensing and signaling device for sensing and signaling presence of a fire-related anomaly on the secondary power control unit;
    the sensing and signaling device being interconnected with the primary power control unit; and
    the primary power control unit being adapted to interrupt input power to the secondary power control unit upon receipt of a fire signal from the sensing and signaling device.

8. The aircraft of claim 7 wherein the second location in which secondary power control unit is positioned is not a fire-containment location.

9. The aircraft of claim 7:
    wherein the secondary power control unit is constructed from self-extinguishing materials; and
    wherein fire will not propagate in the secondary power control unit in an absence of input power to the unit.

10. The aircraft of claim 7 further comprising;
    a set of electrical loads connected to the secondary power control unit with branch circuit wiring; and
    wherein the set of electrical loads is located relatively close to the secondary power control units and relatively far from the primary power control unit.

11. The aircraft of claim 7 further comprising:
at least a first and second one of the secondary power control units;
a first set of electrical loads connected to the first secondary power control unit;
a second set of electrical loads connected to the second secondary power control unit;
wherein the first secondary power control unit is positioned in a location different from a location of the second secondary power control unit;
wherein the first set of electrical loads is located relatively close to the first secondary power control unit and relatively far from the second secondary power control unit; and
wherein the second set of electrical loads is located relatively close to the second secondary power control units and relatively far from the first secondary power control unit.

12. The aircraft of claim 7 wherein the at least one secondary power control unit comprises a housing with vents that permit convection flow of cooling air through the housing.

13. The aircraft of claim 7 wherein the at least one secondary power control unit comprises:
a plurality of LRM's spaced apart from one another;
a plurality of fire walls positioned between adjacent ones of the LRM's;
a plurality of sensing detectors positioned so that a fire-related anomaly on a particular one of the LRM's can be uniquely associated with the particular LRM; and
wherein input power to the particular LRM can be interrupted without interrupting input power to other ones of the LRM's in the secondary power control unit so that fire-suppression protection is provided for the secondary power control unit without interrupting functionality of the other ones of the LRM's.

14. A method for controlling power distribution in a vehicle, comprising the steps of:
distributing electrical power to a secondary power control unit from a primary power control unit located in a fire-containment enclosure;
distributing electrical power from the secondary power control unit;
sensing for a presence of a fire-related anomaly in the secondary power control unit;
interrupting power flow to the secondary power control unit from the primary power control unit in the event of the fire-related anomaly; and
allowing the fire-related anomaly to self-extinguish whereby fire-suppression protection for the secondary power control unit is provided.

15. The method of claim 14 comprising the further steps of:
signaling the primary power control unit in the event of the fire-related anomaly; and
interrupting power flow, responsively to the signaling, in a trunk connected to the secondary power control unit in which the fire-related anomaly is sensed.

16. The method of claim 15 wherein the step of interrupting power flow in a trunk comprises opening an overcurrent circuit breaker connected to the trunk while current in the trunk is less than an overcurrent rating of the circuit breaker.

17. The method of claim 14 wherein the step of sensing for presence of a fire-related anomaly comprises sensing for presence of infrared energy in excess of a predetermined threshold.

18. The method of claim 17 further comprising the steps of:
gathering infrared energy from a plurality of locations in the secondary power control center in a light pipe; and
conveying the gathered infrared energy to an infrared sensor.

19. The method of claim 14 wherein the step of sensing for presence of a fire-related anomaly comprises sensing for a change of impedance, in excess of a predetermined threshold, in a eutectic salt detector.

20. The method of claim 14 further comprising the step of positioning the secondary power control unit in a location that is outside of a fire-containment enclosure and that is close to electrical loads controlled by the secondary power control unit.

* * * * *